(12) United States Patent
Isonuma et al.

(10) Patent No.: US 6,282,173 B1
(45) Date of Patent: Aug. 28, 2001

(54) PROCESSING APPARATUS FOR MEASURING PERFORMANCE MONITORING PARAMETERS

(75) Inventors: Yutaka Isonuma; Miyuki Kawataka; Mikio Nakayama, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/032,561

(22) Filed: Feb. 27, 1998

(30) Foreign Application Priority Data

Jul. 11, 1997 (JP) .................................................. 9-186714

(51) Int. Cl.$^7$ ...................................................... G06F 11/00
(52) U.S. Cl. ............................ 370/242; 370/252; 714/47; 714/48; 714/704
(58) Field of Search .................................. 370/242, 252; 714/47, 48, 704, 706

(56) References Cited

U.S. PATENT DOCUMENTS 5,691,976 * 11/1997 Engdahl ................................ 370/242
5,703,409 * 12/1997 Fukumitsu ............................ 371/5.1
6,067,288 * 5/2000 Miller .................................... 370/242

FOREIGN PATENT DOCUMENTS 417429   1/1992   (JP) .

* cited by examiner

Primary Examiner—Hassan Kizou
Assistant Examiner—Roberta Stevens
(74) Attorney, Agent, or Firm—Helfgott & Karas, P.C.

(57) ABSTRACT

A processing apparatus for measuring accumulated values of performance monitoring (PM) parameters concerning a reception signal received by a transmission device, which is capable of detecting upper layer failures in a more accurate, hardware-based way, without increasing the workload imposed on the system's firmware. PM parameters represent the statistics of events that meet prescribed criteria for defects and anomalies in the reception signal. The processing apparatus has a plurality of failure detection units to detect different kinds of failures in the reception signal and produce failure detection signals corresponding thereto. Those failure detection units include a first failure detection unit that detects a first kind of failure and a second failure detection unit that detects a second kind of failure. On the basis of the failure detection signals, a PM controller detects at least one kind of PM parameter, and a counter unit accumulates the detected PM parameter. A control signal generator produces a stop command signal that is activated while at least the second kind of failure is present. This stop command signal is supplied to the first failure detection unit to inhibit its operation and stop the detection of the first kind of failure.

6 Claims, 11 Drawing Sheets

PROCESSING APPARATUS FOR MEASURING PERFORMANCE MONITORING PARAMETERS

BACKGROUND OF THE INVENTION

1. Field of the Invention

The present invention relates to a processing apparatus for measuring performance monitoring parameters in transmission equipment, and particularly, to a processing apparatus for measuring performance monitoring parameters with improved accuracy in detecting transmission signal errors.

2. Description of the Related Art

Standardization of performance monitoring (PM) has resulted in G.826 and other recommendations formulated by the International Telecommunication Union—Telecommunication Sector (ITU-T), which provide common definitions for signal quality management in transmission paths. In actual error performance measurements, transmission equipment monitors incoming bit streams to detect performance anomalies and defects (e.g., bit errors), collects error data on some prescribed criteria, and reports the statistics of the detected errors, called "PM parameters."

FIG. 10 is a block diagram which shows a typical configuration of a conventional PM parameter processing unit, which is composed of the following main functional blocks: a failure detection unit 102, a PM controller 103, a counter unit 104, and a control signal generator 105. Reception signals carried over a transmission line 101 are monitored by the failure detection unit 102, which comprises a CV detector 102a and an LOS detector 102b. The CV detector 102a detects "Code Violation" (CV) errors in the reception signals, while the LOS detector 102b detects "Loss of Signal" (LOS) conditions. CV errors include bit errors, for instance, and LOS means the absence of reception signals lasting for a prescribed period. The detected CV errors are sent to an "Errored Second" (ES) detector 103a and a "Severely Errored Second" (SES) detector 103b disposed in the PM controller 103, as well as to a "Code Violation-Line" (CV-L) counter 104a in the counter unit 104. Likewise, the detected LOS condition is sent to the ES detector 103a and SES detector 103b in the PM controller 103, an "LOS Second-Line" (LOSS-L) counter 104b in the counter unit 104, and the control signal generator 105. The CV-L counter 104a counts the occurrences of CV errors. The LOSS-L counter 104b measures the duration of LOS conditions in seconds. The ES detector 103a sends an ES-L indication signal to an ES-L (Errored Second-Line) the counter 104c in the counter unit 104, when one or more CV errors have been observed in a predetermined time period or when an LOS condition has been detected. The ES-L counter 104c measures the duration of this ES-L indication signal in seconds. The SES detector 103b sends an SES-L indication signal to a "Severely Errored Second-Line" (SES-L) counter 104d in the counter unit 104, when 45 or more CV errors have occurred within a predetermined time period or when an LOS condition has been detected. An SES-L counter 104d measures the duration of this SES-L indication signal in seconds.

The control signal generator 105 watches the LOS detection signal, and when an LOS condition is detected in a certain time segment, it generates a control signal for that time segment. The control signal generated as such is supplied to the CV detector 102a so as to stop its operation. The next section will describe the details of this process, with reference to FIG. 11.

FIG. 11 is a timing diagram which describes the operation of the conventional PM parameter processing unit of FIG. 10, which specifically shows (A) time segments, (B) lower layer failures, (C) upper layer failures, (D) LOS condition, (E) the number of lower layer failures, and (F) failures detected by the CV detector. Note that the time axis is divided into 1-second time segments (A) and some elements in the PM parameter processing unit operate on this segmented time basis.

This timing diagram of FIG. 11 assumes that some lower layer failures (B) have happened, and thus the LOS detector 102b has detected some LOS conditions. The LOS conditions, which mean the absence of the reception signal, derivatively cause bit errors to be sensed by the CV detector 102a. As a result, some upper layer failures will be detected as indicated by the upward arrows (e) and (f) in FIG. 11. Although the upper layer failures (C) seemingly include many error indication pulses, only five pulses (a), (b), (c), and (d) represent the true bit errors independent of the LOS conditions, while the others are false errors derived from the LOS conditions. In such a case, the CV detector 102a has to detect only those genuine errors (a), (b), (c), and (d), but not the false ones (e) and (f). In reality, however, the CV detector 102a is unable to discriminate the false failures by itself. If the CV detector 102a signaled all those failures without discrimination, the counter unit 104 would accumulate the upper layer failures erroneously, and thus the resultant PM parameters would exhibit much larger values than the true values.

The conventional processing unit employs the control signal generator 105 that produces an appropriate control signal to avoid the above-described problem. In the present context shown in FIG. 11, the control signal generator 105 recognizes the presence of LOS conditions (D) from the output of the LOS detector 102b. It should be noted here that this LOS recognition is conducted on the basis of the predetermined time segments (A). More specifically, the control signal generator 105 drives its control signal output to "1" to disable the CV detector 102a, when an LOS is detected in each time segment (e.g., 1 second). In turn, it resets the signal to "0" when no LOS condition is observed. Meanwhile, the number of upper layer failures detected by the CV detector 102a in each time segment is indicated in (E) of FIG. 11. The CV detector 102a, however, does not always output the number of upper layer failures (E) as is, but it masks all failures in the time segment when the control signal with a value of "1" has been received from the control signal generator 105. Only when the control signal is "0," the CV detector 102a reports the number of detected upper layer failures as originally is. As shown in (F) of FIG. 11, the CV detector 102a indicates no failure in the first three time segments (1) to (3) due to the failure masking operations by the control signal generator 105.

In this way, the conventional PM parameter processing unit avoids the problem of false failure detection. However, there arises a side effect that the processing unit may fail to detect some true upper layer failures, such as (a), (b), and (c), which must be detected by the CV detector 102a. This is because the control signal generator 105 produces the control signal on the basis of discrete time segments, and the control signal masks all upper layer errors regardless of "true" or "false," within the time segment in which an LOS condition is observed. Accordingly, the counters in the counter unit 104 are unable to correctly accumulate the values of PM parameters.

The errors in the counter values obtained from the counter unit 104 could be compensated for by applying some appropriate firmware processes. However, it is desirable to seek a more accurate, hardware-based way of measuring the PM parameters, not to increase the workload imposed on the firmware.

SUMMARY OF THE INVENTION

Taking the above into consideration, an object of the present invention is to provide a PM parameter processing apparatus for measuring accumulated values of PM parameters, which is capable of detecting upper layer failures in a more accurate, hardware-based way that does not increase the workload imposed on the firmware.

To accomplish the above object, according to the present invention, there is provided a processing apparatus for measuring performance monitoring (PM) parameters concerning a reception signal received by a transmission device. Here, the PM parameters refer to the statistics of events that meet prescribed criteria for defects and anomalies in the reception signal.

This processing apparatus comprises the following elements: a plurality of failure detection units, a PM controller, a counter unit, and a control signal generator. The failure detection units detect different kinds of failures in the reception signal and produce failure detection signals corresponding thereto. The failure detection units include a first failure detection unit to detect a first kind of failure and a second failure detection unit to detect a second kind of failure. The PM controller detects at least one kind of PM parameter, based on the failure detection signals produced by the failure detection units. The counter unit accumulates the PM parameter detected by the PM controller. The control signal generator generates a stop command signal that is activated while at least the second kind of failure is present. It then supplies the stop command signal to the first failure detection unit to stop the detection of the first kind of failure.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

An embodiment of the present invention will be described below with reference to the accompanying drawings.

Figure 1:
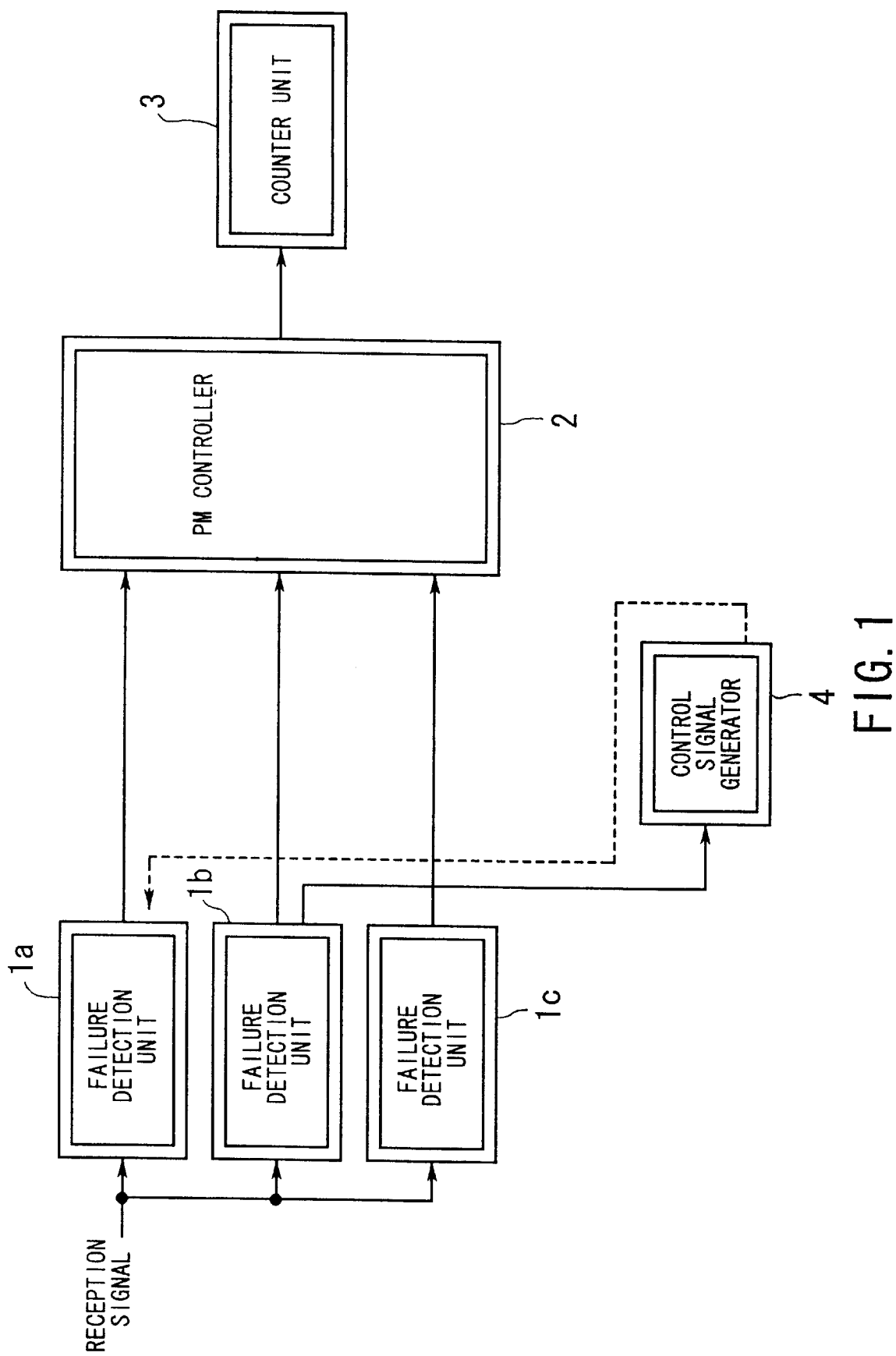
FIG. 1 is a conceptual view of the present invention.

Referring first to FIG. 1, the following section will describe the concept of a first embodiment of the present invention. FIG. 1 shows a PM parameter processing unit of the first embodiment, which comprises the following elements: a plurality of failure detection units 1a to 1c, a PM controller 2, a counter unit 3, and a control signal generator 4. The failure detection units 1a to 1c detect different kinds of failures in the reception signal and produce failure detection signals corresponding thereto. Here, the failure detection unit 1a detects a first kind of failure and the failure detection unit 1b detects a second kind of failure. The PM controller 2 detects at least one kind of PM parameter, based on the failure detection signals provided by the failure detection units 1a to 1c. The counter unit 3 accumulates the PM parameter detected by the PM controller. The control signal generator 4 generates a stop command signal that is activated while at least the second kind of failure is present. It then supplies the stop command signal to the failure detection unit 1a to stop the detection of the first kind of failure. This PM parameter processing unit configured as such will be described more specifically in the next paragraphs, with reference to a timing diagram of FIG. 2.

Figure 2:
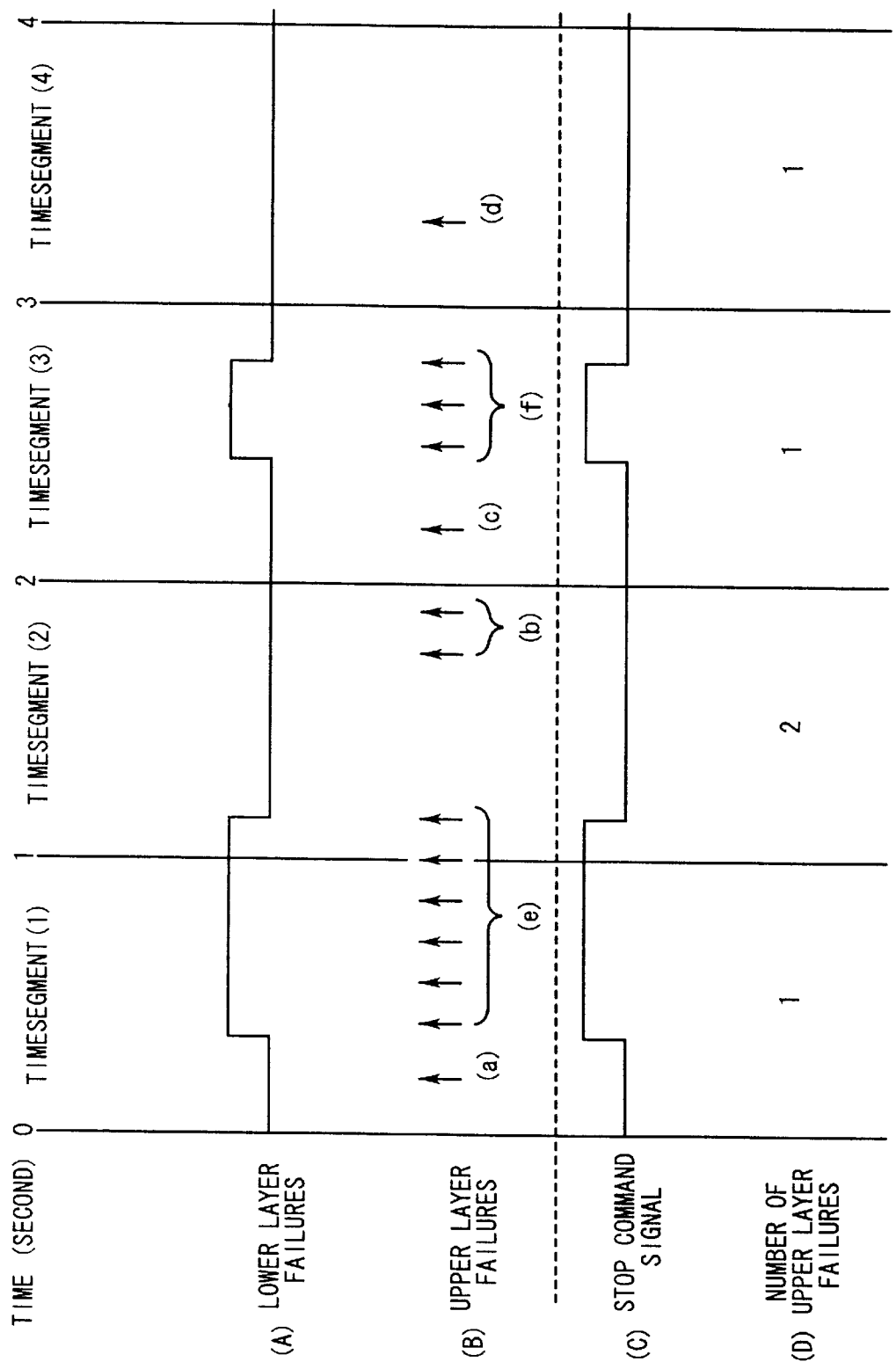
FIG. 2 is a timing diagram which shows an example of (A) lower layer failures, (B) upper layer failures, (C) stop command signal, and (D) the number of upper layer failures.

Suppose, for example, that the failure detection unit 1a has detected some upper layer failures (e.g., bit errors) as shown in (B) of FIG. 2, while the failure detection unit 1b has observed some lower layer failures (e.g., LOS) as shown in (A) of FIG. 2. Among those illustrated in (B), the upper layer failures (e) and (f) actually derive from the lower layer failures shown in (A) of FIG. 2. That is, only the other upper layer failures (a), (b), (c), and (d) are genuine upper layer failures that have nothing to do with lower layer failures such as LOS.

From the lower layer failures detected by the failure detection unit 1b, the control signal generator 4 produces a stop command signal (C) for only a limited time period when this lower layer failure is present. This stop command signal is then supplied to the failure detection unit 1a which is checking upper layer failures in the reception signal. Upon receipt of the stop command signal, the failure detection unit 1a stops its operation, not to detect any upper layer failures while the stop command signal is active (i.e., "1"). Accordingly, the failure detection unit 1a outputs only the genuine upper layer failures (a), (b), (c), and (d) as shown in (C) of FIG. 2, thus resulting in the failure count values (D).

Based on the outputs of the failure detection units 1a, 1b, and 1c, the PM controller 2 detects at least one kind of PM parameter, which is observed as an event that meets a prescribed criterion for defects and anomalies found in the reception signal. The detected events are sent to the counter unit 3 for statistical processes, or accumulation. Although FIG. 1 shows only one counter unit, a practical PM parameter processing unit may be designed in general to measure a plurality of events, or PM parameters, and thus it must be equipped with the same number of counter units for accumulation of individual events.

As described above, the PM parameter processing unit of the present invention can detect upper layer failures in a more accurate, hardware-based way that does not increase the workload imposed on the firmware.

Figure 3:
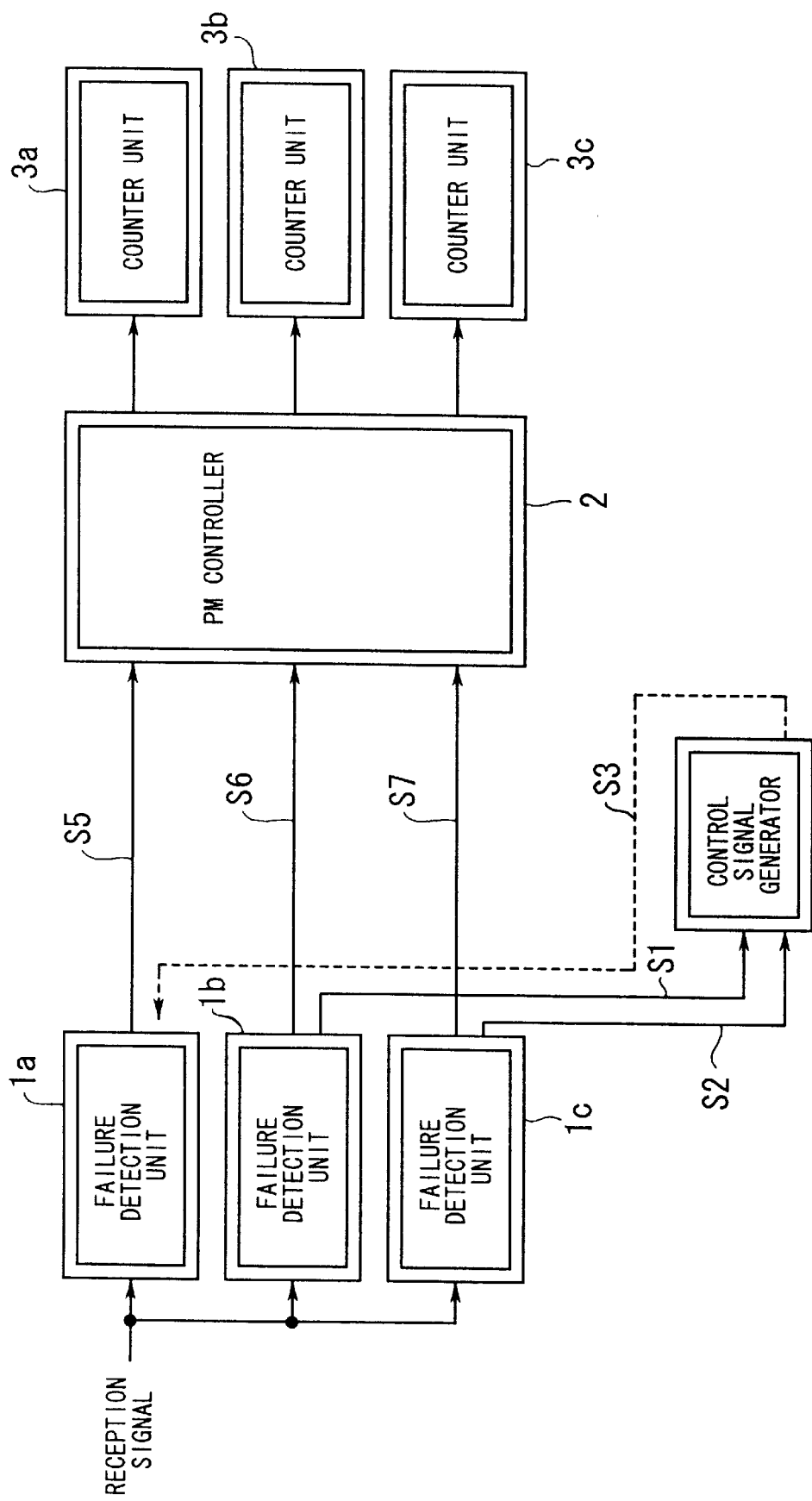
FIG. 3 is a detailed block diagram of a first embodiment of the present invention.
Figure 10:
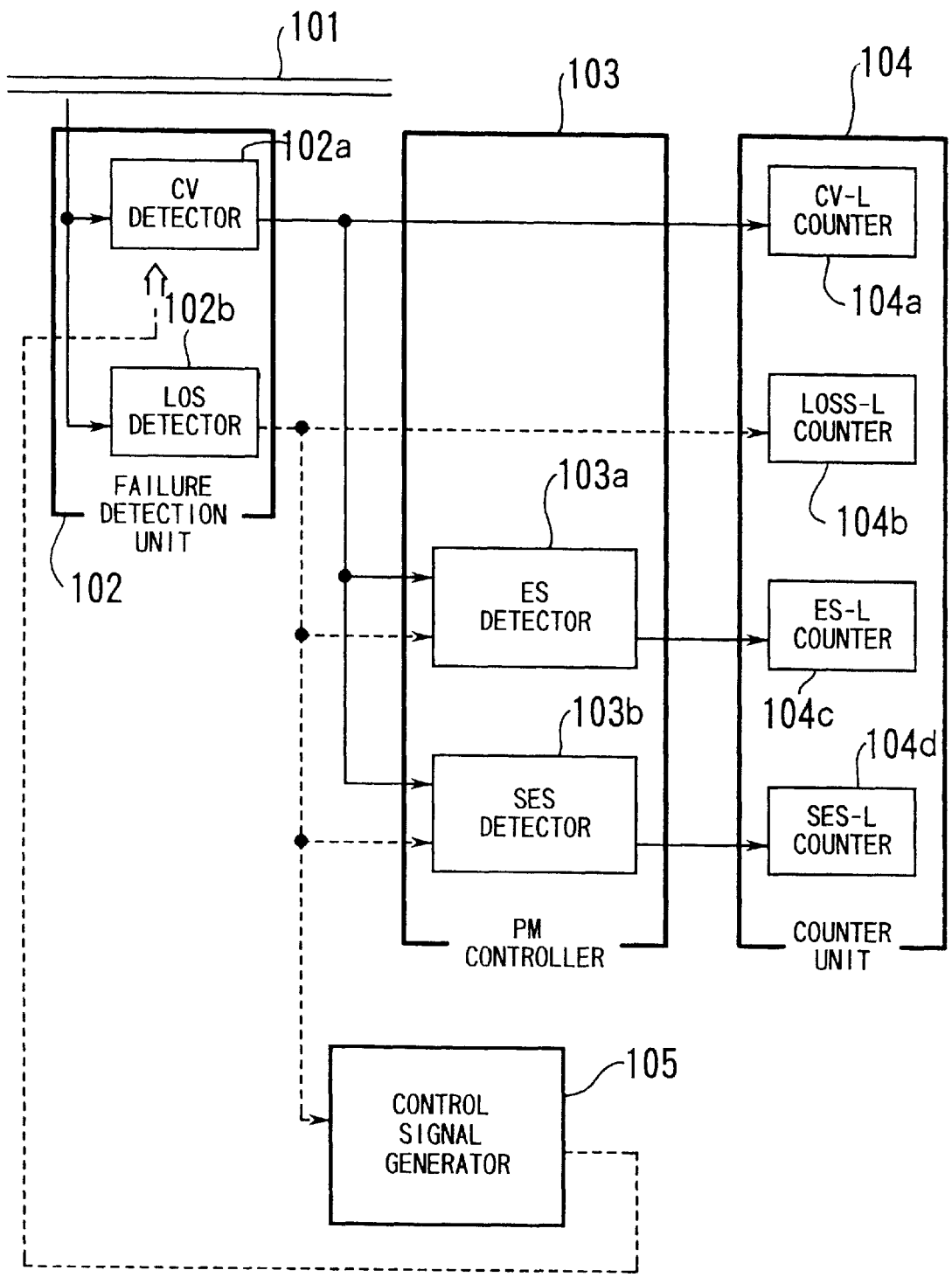
FIG. 10 is a block diagram which shows a typical configuration of a conventional PM parameter processing unit.
Figure 11:
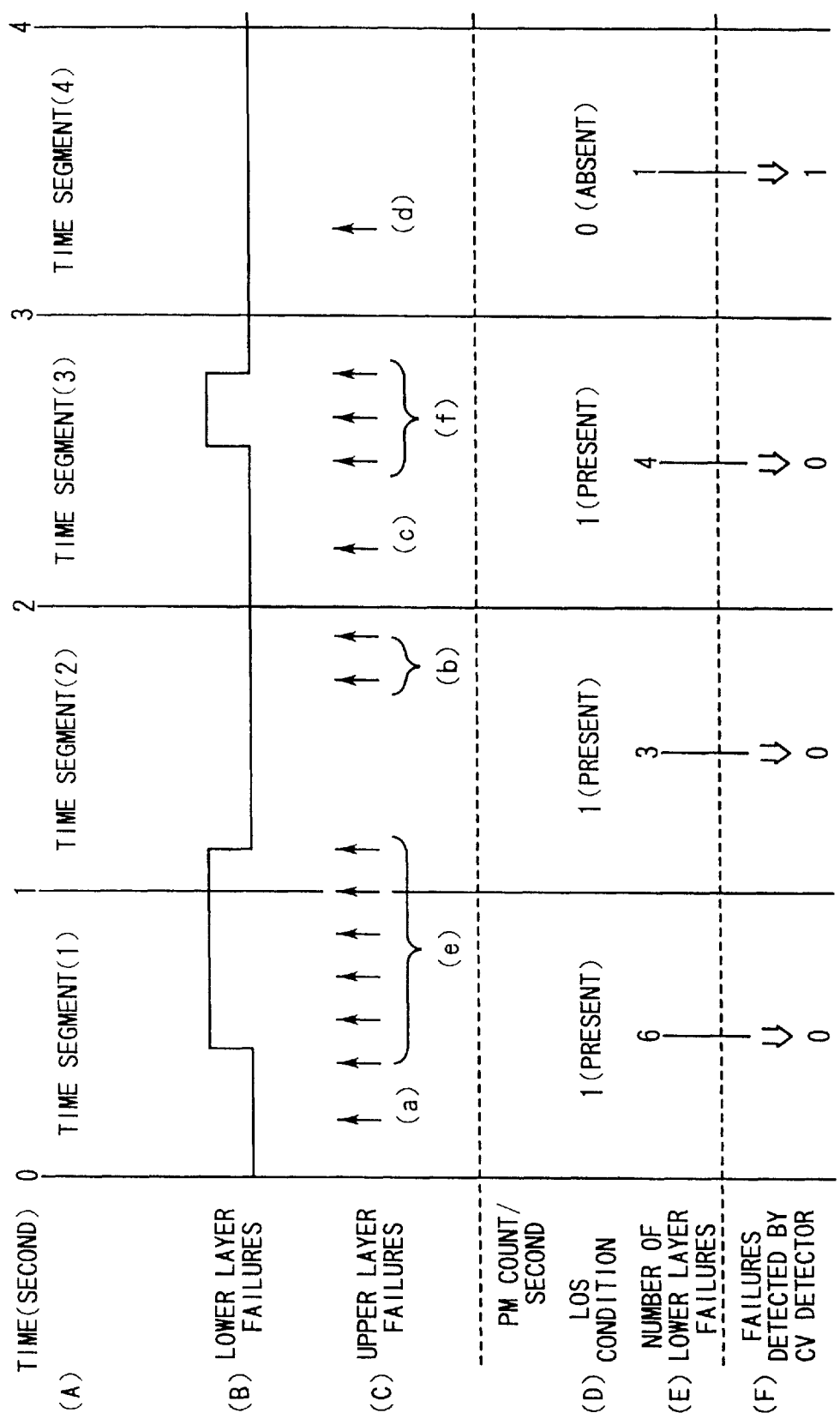
FIG. 11 is a timing diagram which describes the operation of the conventional PM parameter processing unit by specifically showing (A) time segments, (B) lower layer failures, (C) upper layer failures, (D) LOS condition, (E) the number of lower layer failures, and (F) failures detected by CV detector.

Now, the first embodiment of the present invention will be explained in detail below. FIG. 3 is a block diagram of a PM parameter processing unit according to the first embodiment. In this unit, a failure detection unit 1a is responsible for detection of upper layer failures (e.g., bit errors), while other failure detection units 1b and 1c are designed to detect lower layer failures (e.g., LOS). Here, the two failure detection units 1b and 1c detect different kinds of lower layer failures. Based on the output signals S5 to S7 of those failure detection units 1a to 1c, the PM controller 2 identifies three PM parameters by detecting different kinds of events that meet some prescribed criteria. The detected events are sent to counter units 3a to 3c for accumulation. These counter units 3a to 3c count those individual events, or PM parameters, identified by the PM controller 2. In comparison with FIG. 10, the failure detection units 1a to 1c correspond to the CV detector 102a and LOS detector 102b, the PM controller 2 to the PM controller 103, and the counter units 3a to 3c to the counter unit 104 including the CV-L counter 104a, LOSS-L counter 104b, ES-L counter 104c, and SES-L counter 104d.

On the basis of the lower layer failures detected by the failure detection units 1b and 1c, the control signal generator 4 produces a stop command signal S3 only for a limited time period when either kind of failure, S1 or S2, is present. The control signal generator 4 supplies this stop command signal S3 to the failure detection unit 1a which is monitoring upper layer failures. Further details of the control signal generator 4 will be clarified later on, with reference to FIG. 5. Upon receipt of the stop command signal S3, the failure detection unit 1a stops its operation, and does not detect any upper layer failures while the stop command signal S3 is active.

Figure 4:
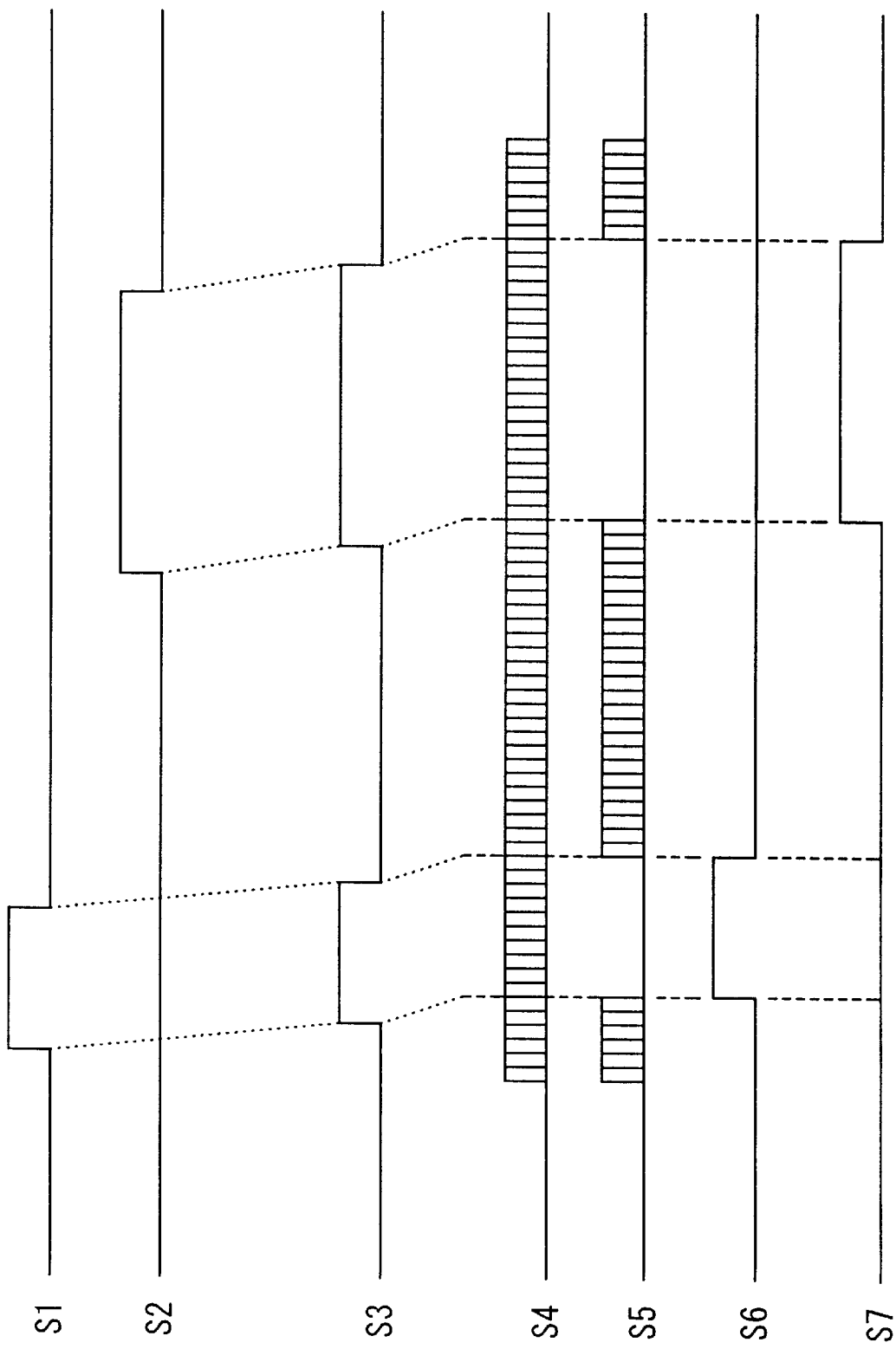
FIG. 4 is a timing diagram which describes various signals to explain the operation of an apparatus according to the first embodiment.

FIG. 4 is a timing diagram which describes specific signals to explain the operation of the PM parameter processing unit according to the first embodiment depicted in FIG. 3. In this timing diagram, symbols S1 to S7 (except for S4) refer to the signals observed in the PM parameter processing unit of FIG. 3. More specifically, the failure detection unit 1b detects a lower layer failure as the signal S1 shows, while the failure detection unit 1c detects another kind of lower layer failure as the signal S2 indicates. The control signal generator 4 then produces the stop command signal S3 having a value of "1" only for a limited period when either failure signal S1 or S2 is active. The control signal generator 4 supplies this stop command signal to the failure detection unit 1a. FIG. 4 depicts those signals including some delay time inherent in each part of the circuit.

The failure detection unit 1a is configured to stop its operation, not to detect any upper layer failures while the stop command signal is active. Signal S4 in FIG. 4 shows upper layer failures that the failure detection unit 1a would output if the stop command signal S3 was not present. In reality, the stop command signal S3 is driven to "1" in some particular periods according to the lower layer failure signals S1 and S2, and this signal S3 inhibits the failure detection unit 1a from outputting the upper layer failures detected during the periods. Signal S5, the resultant upper layer failure signal, is provided finally to the PM controller 2. Signals S6 and S7 are the outputs of the failure detection units 1b and 1c, which are also supplied to the PM controller 2. Those two signals are derived from the lower layer failures signals S1 and S2, with some delay times added.

In this way, the failure detection unit 1a outputs accurate detection signals for upper layer failures, masking derivative failures at its output stage. This hardware-based mechanism enables accurate detection, as well as eliminating the need for error compensation at the PM parameter processing unit 2 or the later stages, without requiring any increase in firmware workloads.

Figure 5:
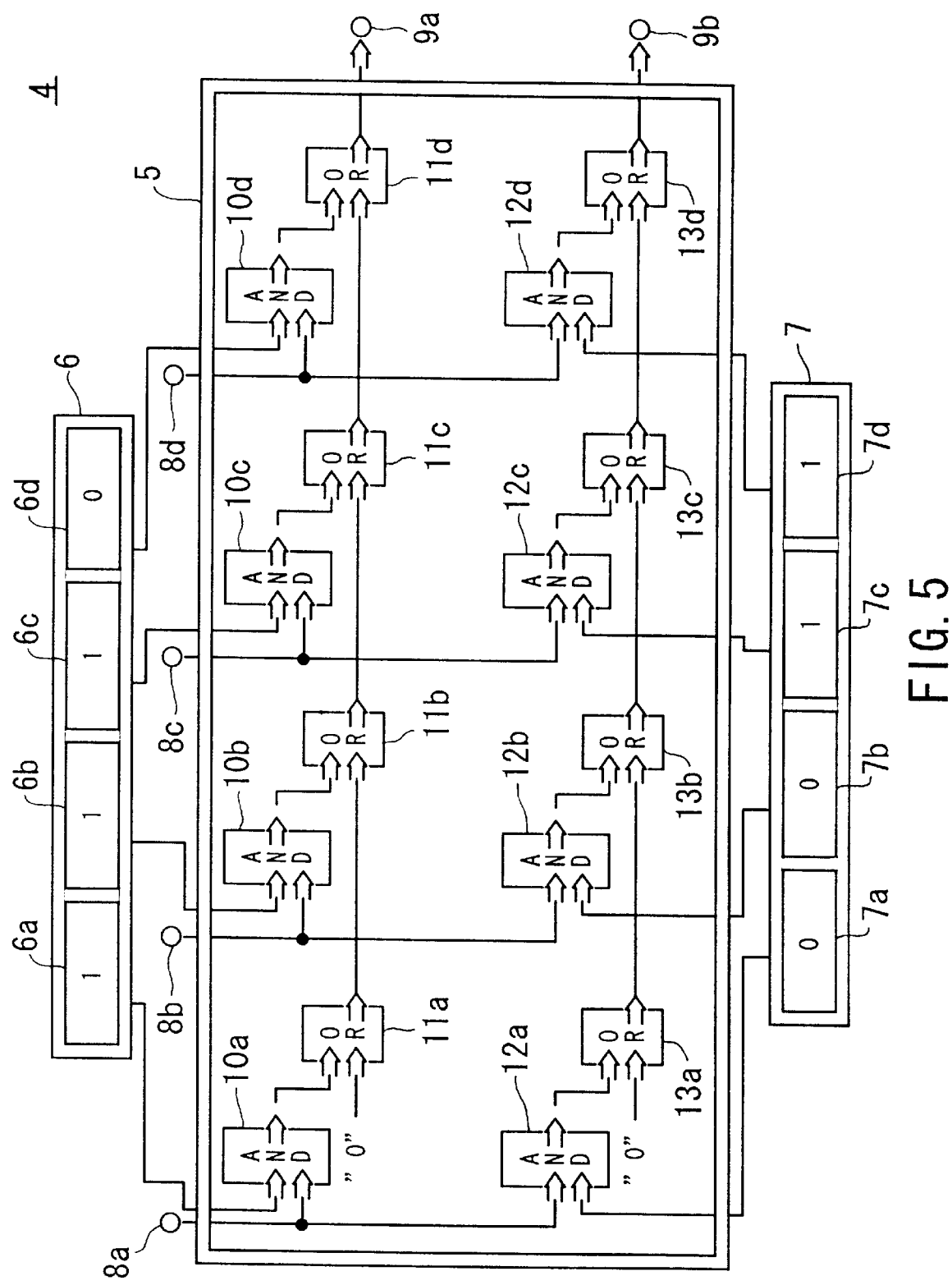
FIG. 5 is a diagram which shows the internal structure of a control signal generator.

Referring now to FIG. 5, the following paragraphs will present the internal structure of the control signal generator 4. This general design of the control signal generator 4 is intended for versatile usage in the processing units, expandable to any number of failures to be detected. More specifically, this versatile control signal generator is composed of a logic circuit 5 and two registers 6 and 7. The logic circuit 5 contains eight 2-input AND gates 10a–10d and 12a–12d, eight 2-input OR gates 11a–11d and 13a14 13d, four input ports 8a–8d, and two output ports 9a and 9b. In accordance with the number of input ports, the registers 6 and 7 contain the same number (four) of internal storage cells, 6a–6d and 7a–7d, respectively.

Inside the logic circuit 5, the input port 8a is connected to input terminals of the AND gates 10a and 12a, while the next input port 8b is connected to input terminals of the AND gates 10b and 12b. Likewise, the input port 8c is connected to input terminals of the AND gates 10c and 12c, and the input port 8d is connected to input terminals of the AND gates 10d and 12d. The outputs of the storage cells 6a–6d in the register 6 are connected to the remaining input terminals of the AND gates 10a–10d, respectively. The outputs of the AND gates 10a–10d are connected to input terminals of the OR gates 11a–11d, respectively. The output of the OR gate 11a is connected to the remaining input terminal of the next OR gate 11b, while the output of the OR gate 11b is connected to the remaining input terminal of the next OR gate 11c. Likewise, the output of the OR gate 11c is connected to the remaining input terminal of the OR gate 11d. Finally, the output of the OR gate 11d is fed to the output port 9a.

Further, the outputs of the storage cells 7a–7d in the register 7 are connected to the remaining input terminals of the AND gates 12a–12d, respectively. The outputs of the AND gates 12a–12d are connected to input terminals of the OR gates 13a–13d, respectively. The output of the OR gate 13a is connected to the remaining input terminal of the next OR gate 13b, while the output of the OR gate 13b is connected to the remaining input terminal of the next OR gate 13c. Likewise, the output of the OR gate 13c is connected to the remaining input terminal of the OR gate 13d. Finally, the output of the OR gate 13d is fed to the output port 9b. The remaining input terminals of the OR gates 11a and 13a are pulled down to logical "0."

Some control data is supplied from an external source to the storage cells 6a–6d in the register 6, which determines a combination of valid inputs. This control data enables several particular input signals entered to the input port 8a–8d to be selectively output through the output port 9a. In the present example of FIG. 5, the register 6 is provided with such control data as "1,1,1,0" for setting the storage cells 6a to 6d in a bitwise manner. This register setting actually allows three input signals being fed to the input port 8a, 8b, and 8c to appear at the output port 9a after passing through the internal paths in the logic circuit 5. The input signal to the input port 8d will be suppressed because of the corresponding setting value of "0" in the storage cell 6d.

Similarly to the register 6, another control data is given by an external source to the storage cells 7a–7d in the register 7 so as to define a combination of valid inputs. This control data enables several particular input signals entered to the input port 8a–8d to be selectively output through the output port 9b. As FIG. 5 shows, the register 7 is programmed as "0,0,1,1," corresponding to its storage cells 7a to 7d, respectively. This register setting allows only two input signals being fed to the input port 8a and 8b to appear at the output port 9b. In contrast, the other two input signals fed to the input ports 8c and 8d will never appear at the output port 9b.

The above-described versatile control signal generator of FIG. 5 can be adapted to the PM parameter processing unit of FIG. 3 by making the following signal connections as well as setting the control data "1,1,0,0" to the register 6.

| SIGNAL | FAILURE DETECTION UNITS | LOGIC CIRCUIT 5 |
|---|---|---|
| S1 | output of 1b | --> input port 8a |
| S2 | output of 1c | --> input port 8b |
| S3 | control input of 1a | <-- output port 9a |

Figure 6:
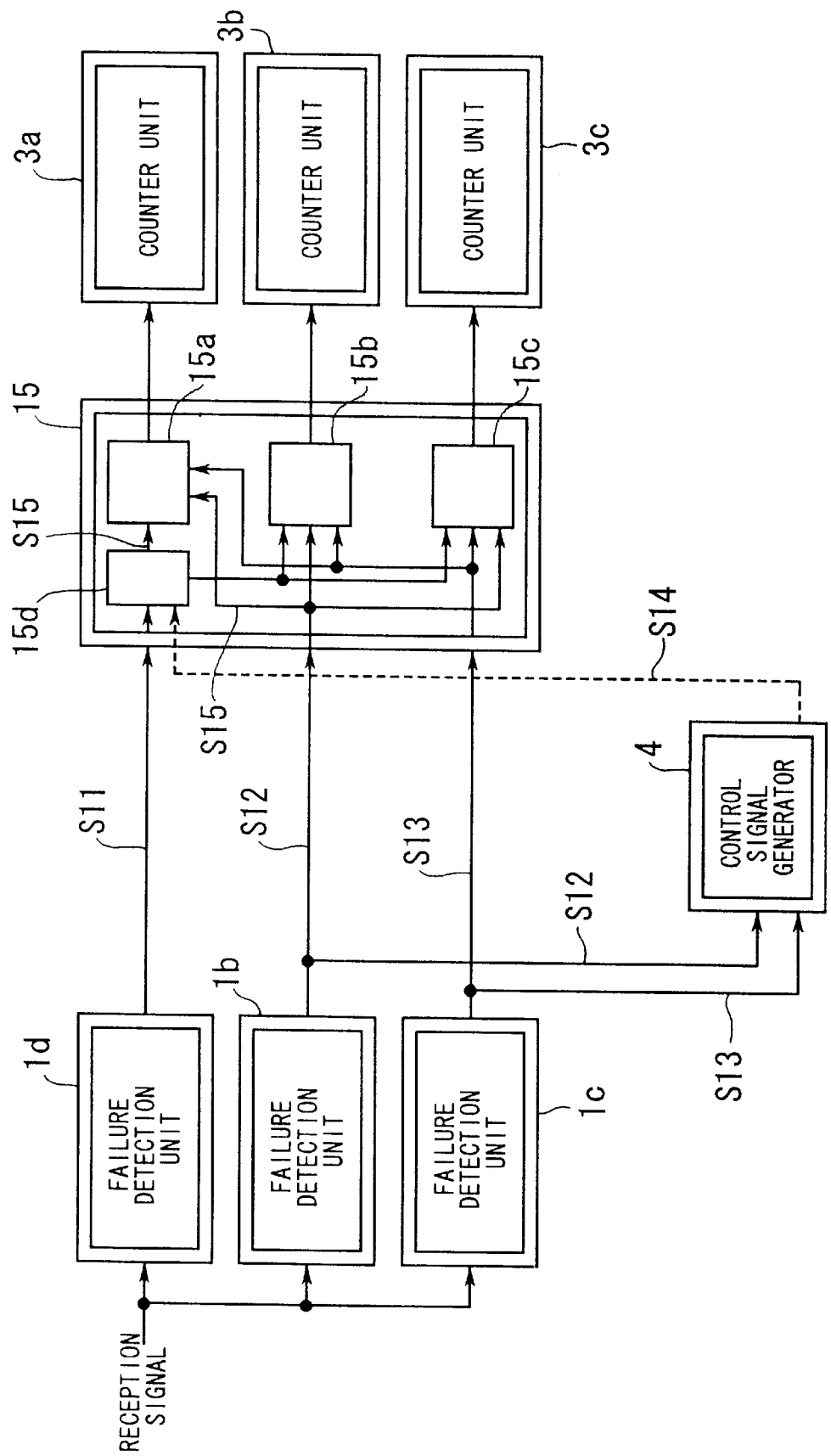
FIG. 6 is a diagram which shows the configuration of a second embodiment of the present invention.

Referring to FIG. 6, the next section will describe a second embodiment of the present invention. Since the second embodiment has basically the same structure as that of the first embodiment, the following will focus on its distinctive points, while affixing like reference numerals to like elements.

The PM parameter processing unit in the second embodiment is equipped with a failure detection unit 1d and PM controller 15, which are different from the failure detection unit 1a and control signal generator 4 in the first embodiment. While being responsible for detecting upper layer failures, the failure detection unit 1d in the second embodiment has no input terminal to accept the stop command signal that suppresses the output of detection signals. Therefore, the failure detection unit 1d may produce unwanted detection signals indicative of upper layer failures that have been derived from lower layer failures.

In the second embodiment, the stop command signal S14 produced by the control signal generator 4 is supplied to a gate unit 15d (described later) as part of the PM controller 15. Based on the outputs of those failure detection units 1b to 1d, the PM controller 15 identifies three PM parameters by using detectors 15a to 15c which detect different kinds of events that meet some prescribed criteria. The detected events are sent to counter units 3a–3c for accumulation. The PM controller 15 comprises a gate unit 15d to accept the output signal S11 of the failure detection unit 1d and distribute it to the detectors 15a to 15c in the PM controller 15.

Figure 7:
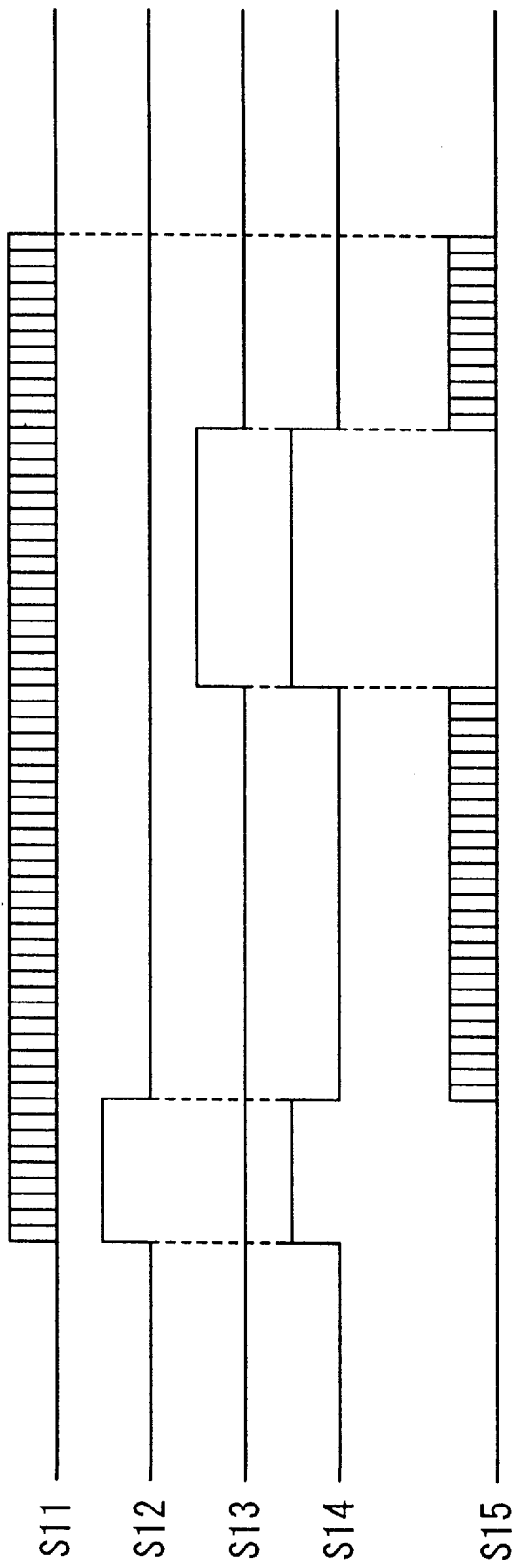
FIG. 7 is a timing diagram which describes various signals to explain the operation of an apparatus according to the second embodiment.

FIG. 7 is a timing diagram which specifically describes the operation of the PM parameter processing unit of FIG. 6. FIG. 7 shows five signals S11 to S15 sampled in the circuit of FIG. 6. More specifically, the failure detection unit 1d detects upper layer failures S11 and the failure detection units 1b and 1c detect different kinds of lower layer failures S12 and S13. The control signal generator 4 produces the stop command signal S14 having a value of "1" only for a limited time period when either failure detection signal S12 or S13 is active (or logical "1"). The control signal generator 4 supplies this stop command signal S14 to the failure detection unit 15d in the PM controller 15.

The gate unit 15d blocks the upper layer failure detection signal S11 entering from the failure detection unit 1d, only while the stop command signal S14 is driven to "1." This masking operation yields the signal S15 shown in FIG. 7, which is distributed from the gate unit 15d to the detectors 15a to 15c. Incidentally, the timing diagram of FIG. 7 does not depict any delays of signals, although they are inherent in each part of the circuit.

As such, the second embodiment of the present invention obtains the failure detection signal S15 by appropriately masking unwanted failures with the stop command signal S14 supplied from the control signal generator 4 to the PM controller 15. Similar to the first embodiment, the second embodiment also provides a hardware-based way of detecting the upper layer failures with high accuracy, without increasing firmware workloads. Needless to say, the control signal generator 4 can be constructed with the versatile circuit of FIG. 5, as explained in the first embodiment.

Figure 8:
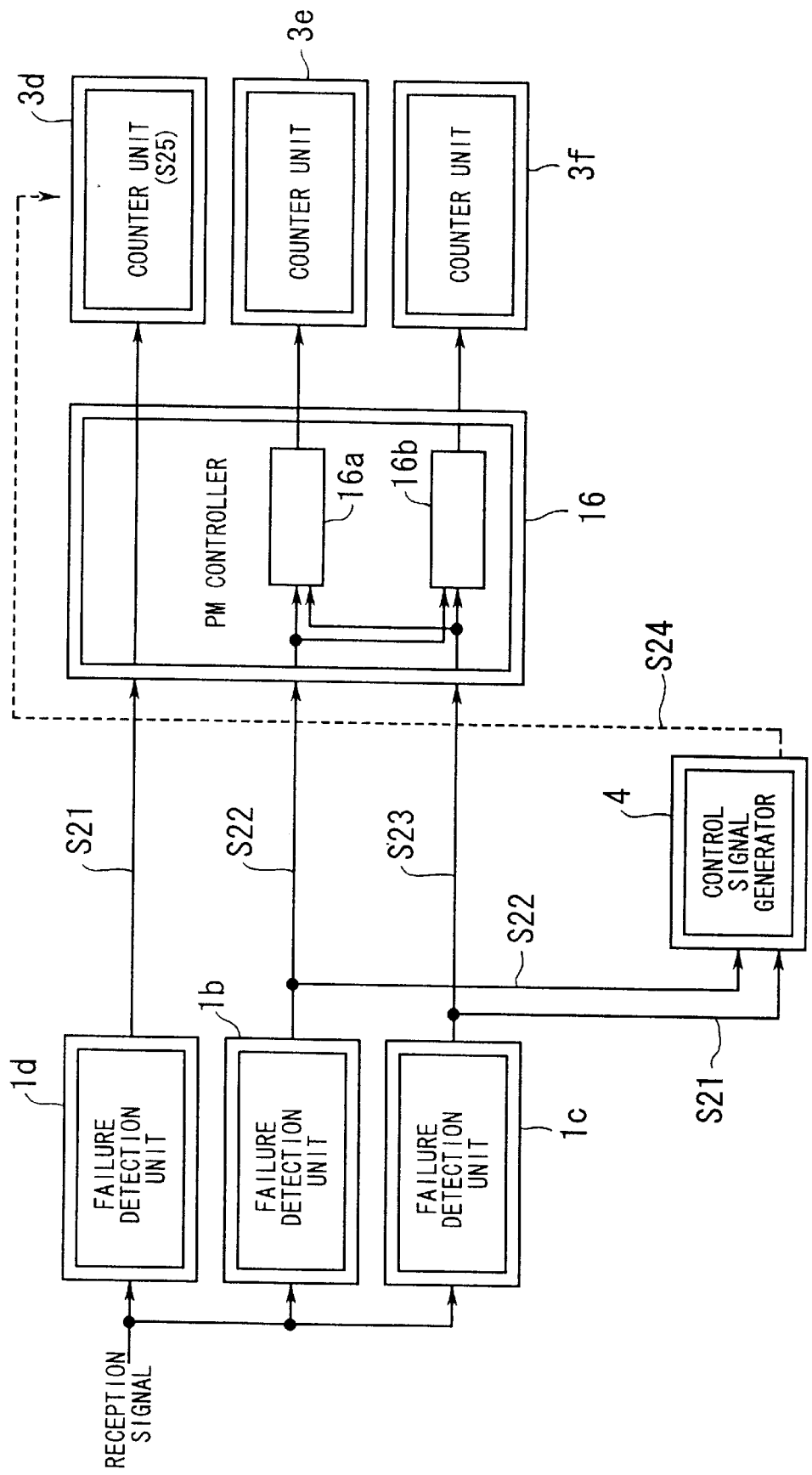
FIG. 8 is a diagram which shows the configuration of a third embodiment of the present invention.

Referring next to FIG. 8, the following section will describe a third embodiment of the present invention. Since the third embodiment has basically the same structure as that of the second embodiment, the following will focus on its distinctive points, while affixing like reference numerals to like elements.

The third embodiment is distinguishable from the two embodiments described earlier in that the control signal generator 4 sends a stop command signal S24 to the counter unit 3d. It is also distinguishable in that a PM controller 16 receives an upper layer failure detection signal S21 from the failure detection unit 1d, and forwards it to the counter unit 3d without making any manipulations. On the basis of the output signals S22 and S23 of failure detection units 1b and 1c, the PM controller 16 identifies two PM parameters by using internal detectors 16a and 16b to detect two different kinds of events that meet some prescribed criteria. The detected events are sent to counter units 3e and 3f for accumulation. The counter unit 3d is configured to stop its operation, not to count any upper layer failures while the stop command signal is driven to "1." The other counter units 3b and 3c count the events, or PM parameters, identified by the detectors 16a and 16b, respectively.

Figure 9:
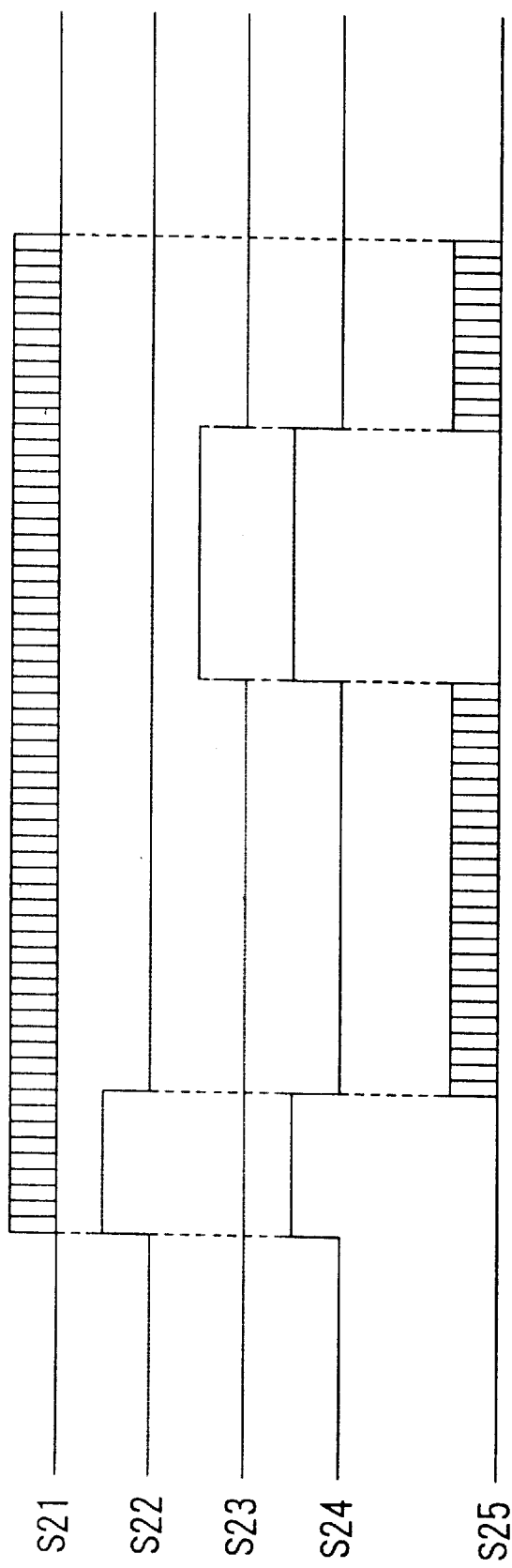
FIG. 9 is a timing diagram which describes various signals to explain the operation of an apparatus according to the third embodiment.

FIG. 9 is a timing diagram which specifically describes the operation of the PM parameter processing unit of FIG. 8 according to the third embodiment. This timing diagram shows five signals S21 to S25 sampled in the circuit of FIG. 8. More specifically, the failure detection unit 1d detects upper layer failures S21, and the failure detection units 1b and 1c detect different kinds of lower layer failures S22 and S23. The control signal generator 4 produces a stop command signal S24 having a value of "1" only for a limited period when either failure signal S22 or S23 is active. The control signal generator 4 supplies this stop command signal S24 to the counter unit 3d.

The counter unit 3d stops counting the upper layer failure detection signal S21 sent from the failure detection unit 1d, while the stop command signal S24 is driven to "1." This is equivalent to counting a signal S25 shown in the bottom of FIG. 9. Incidentally, the timing diagram of FIG. 9 does not depict explicitly the delays of signals, although they are inherent in the circuit.

In this way, the third embodiment of the present invention obtains the failure detection signal S25 by appropriately masking unwanted failures with the stop command signal S24 supplied to the counter unit 3d. Similar to the first and second embodiments, the third embodiment provides a hardware-based way of detecting upper layer failures with improved accuracy, without increasing the firmware workloads. Needless to say, the versatile circuit of FIG. 5 can be adapted to the control signal generator 4, as explained in the first and second embodiments.

The above discussion is summarized as follows. According to the present invention, a plurality of failure detection units detect different kinds of failures, including a first kind of failure and a second kind of failure, and a control signal generator generates a stop command signal that becomes active while at least the second kind of failure is present. The control signal generator then supplies the stop command signal to one of the failure detection units to stop the detection of the first kind of failure. This structural arrangement enables the PM parameter processing unit to detect upper layer failures in a more accurate, hardware-based way, without increasing the workload imposed on the system's firmware.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A processing apparatus for measuring performance monitoring (PM) parameters concerning a reception signal received by a transmission device, the PM parameters being statistics of events that meet prescribed criteria for defects and anomalies, the processing apparatus comprising:

a plurality of failure detecting means for detecting different kinds of failures in the reception signal and producing failure detection signals corresponding thereto, said plurality of failure detecting means including a first failure detecting means for detecting a first kind of failure and a second failure detecting means for detecting a second kind of failure;

PM control means for detecting at least one kind of PM parameter, based on the failure detection signals produced by said plurality of failure detecting means;

counting means for accumulating the PM parameter detected by said PM control means, said counting means operating at predetermined intervals to test whether the second kind of failure is present; and control signal generating means for generating and supplying a stop command signal to said first failure detecting means to stop the detection of the first kind of failure, the stop command signal being activated during a period when the second kind of failure is present, asynchronously with the predetermined intervals at which said counting means tests the presence of the second kind of failure.

2. The processing apparatus according to claim 1, wherein said control signal generating means comprises:

a plurality of input ports which accept the failure detection signals produced by said plurality of failure detecting means;

an output port through which the stop command signal is output; and a register which defines output conditions to allow the failure detection signals being fed to said plurality of input ports to be selectively output through said output port.

3. A processing apparatus for measuring performance monitoring (PM) parameters concerning a reception signal received by a transmission device, the PM parameters being statistics of events that meet prescribed criteria for defects and anomalies, the processing apparatus comprising:

a plurality of failure detecting means for detecting different kinds of failures in the reception signal and producing failure detection signals corresponding thereto, the different kinds of failures including a first kind of failure and a second kind of failure;

PM control means for detecting a plurality of PM parameters, based on the failure detection signals produced by said plurality of failure detecting means;

a plurality of counting means for accumulating the PM parameters detected by said PM control means; and control signal generating means for generating a stop command signal that is activated while at least the second kind of failure is present, and supplying the stop command signal to said PM control means to stop the detection of at least one of the PM parameters relating to the first kind of failure.

4. The processing apparatus according to claim 3, wherein said control signal generating means comprises:

a plurality of input ports which accept the failure detection signals produced by said plurality of failure detecting means;

an output port through which the stop command signal is output; and a register which defines output conditions to allow the failure detection signals being fed to said plurality of input ports to be selectively output through said output port.

5. A processing apparatus for measuring performance monitoring (PM) parameters concerning a reception signal received by a transmission device, the PM parameters being statistics of events that meet prescribed criteria for defects and anomalies, the processing apparatus comprising:

a plurality of failure detecting means for detecting different kinds of failures in the reception signal and producing failure detection signals corresponding thereto, the different kinds of failures including a first kind of failure and a second kind of failure;

PM control means for detecting a plurality of PM parameters, based on the failure detection signals produced by said plurality of failure detecting means;

a plurality of counting means for accumulating the plurality of PM parameters detected by said PM control means; and control signal generating means for generating a stop command signal that is activated while at least the second kind of failure is present, and supplying the stop command signal to one of said plurality of counting means to stop the accumulation of one of the PM parameters relating to the first kind of failure.

6. The processing apparatus according to claim 5, wherein said control signal generating means comprises:

a plurality of input ports which accept the failure detection signals produced by said plurality of failure detecting means;

an output port through which the stop command signal is output; and a register which defines output conditions to allow the failure detection signals being fed to said plurality of input ports to be selectively output through said output port.

* * * * *